US008564584B2

(12) United States Patent
Huang et al.

(10) Patent No.: US 8,564,584 B2
(45) Date of Patent: Oct. 22, 2013

(54) ELECTROPHORETIC DISPLAY AND METHOD OF DRIVING THE SAME

(75) Inventors: Chang-Yu Huang, Hsin-Chu (TW); Chuan-Sheng Wei, Hsin-Chu (TW); Pei-Ming Chen, Hsin-Chu (TW); Chun-Hsiun Chen, Hsin-Chu (TW); Wei-Ming Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 647 days.

(21) Appl. No.: 12/775,443

(22) Filed: May 6, 2010

(65) Prior Publication Data

US 2011/0141086 A1 Jun. 16, 2011

(30) Foreign Application Priority Data

Dec. 11, 2009 (TW) ................................ 98142475 A

(51) Int. Cl.
*G06F 3/038* (2013.01)

(52) U.S. Cl.
USPC ............................ 345/211; 345/204; 345/107

(58) Field of Classification Search
USPC ..................................... 345/87, 204; 359/296
See application file for complete search history.

(56) References Cited

U.S. PATENT DOCUMENTS

| | | | | |
|---|---|---|---|---|
| 6,873,451 | B2 | 3/2005 | Ukigaya | |
| 7,019,889 | B2 | 3/2006 | Katase | |
| 7,359,110 | B2 * | 4/2008 | Katase | 359/296 |
| 7,570,418 | B2 * | 8/2009 | Moriya et al. | 359/296 |
| 7,898,511 | B2 | 3/2011 | Yoo | |
| 8,269,704 | B2 * | 9/2012 | Jung et al. | 345/87 |
| 2008/0122768 | A1 | 5/2008 | Jung | |
| 2008/0174574 | A1 * | 7/2008 | Yoo | 345/204 |
| 2008/0225027 | A1 * | 9/2008 | Toyomura et al. | 345/204 |

FOREIGN PATENT DOCUMENTS

| | | | |
|---|---|---|---|
| CN | 101079233 | A | 11/2007 |
| CN | 101329487 | A | 12/2008 |
| TW | 200849195 | | 12/2008 |

* cited by examiner

*Primary Examiner* — Quan-Zhen Wang
*Assistant Examiner* — Troy Dalrymple
(74) *Attorney, Agent, or Firm* — Winston Hsu; Scott Margo

(57) ABSTRACT

An electrophoretic display with threshold voltage drift compensation functionality includes a gate driving circuit, a data driving circuit, a controller and a pixel array. The gate driving circuit provides plural gate signals according to a scan control signal. The data driving circuit provides plural data signals according to a data control signal. The controller is employed to provide the scan control signal and the data control signal. The pixel array is utilized for displaying images according to the gate signals and the data signals. Each of the gate signals includes a writing enable pulse for enabling write operations of the data signals during a writing period. And during a compensation period, each of the gate signals includes a compensation pulse for performing threshold voltage drift compensation operations on the data switches of the pixel array, and the data signals are set to hold a common voltage.

20 Claims, 8 Drawing Sheets

ELECTROPHORETIC DISPLAY AND METHOD OF DRIVING THE SAME

BACKGROUND OF THE INVENTION

1. Field of the Invention

The present invention relates to an electrophoretic display and a method of driving the same, and more particularly, to an electrophoretic display with threshold voltage drift compensation functionality and a method of driving the same.

2. Description of the Prior Art

Because flat panel displays (FPDs) have advantages of thin appearance, low power consumption, and low radiation, various kinds of flat panel displays have been developed and widely applied in a variety of electronic products such as computer monitors, mobile phones, personal digital assistants (PDAs), or flat panel televisions. Among them, electrophoretic displays (EPDs), also known as electronic papers, have gained more and more attention due to further advantages of thinner feature, flexible body, and easy-to-carry property. In general, the electrophoretic display comprises a gate driving circuit, a data driving circuit and plural pixels. The gate driving circuit is employed to provide a plurality of gate signals. The data driving circuit is employed to provide a plurality of data signals. Each of the pixels includes a data switch, an electrophoretic medium and plural charged particles suspended in the electrophoretic medium. The color of the charged particles is different from that of the electrophoretic medium. The data switch provides a control of writing a corresponding data signal with the aid of a corresponding gate signal, for changing the voltage difference across opposite sides of the electrophoretic medium. And the voltage difference across opposite sides of the electrophoretic medium can be employed to create an electric field for adjusting the position of the charged particles in the electrophoretic medium. Accordingly, the grey level of each pixel can be set according to the color contrast between the charged particles and the electrophoretic medium in conjunction with the suspension depth of the charged particles.

In the operation of the electrophoretic display, each frame time includes a writing period and a retaining period. During the writing period, the charged particles of each pixel are moved to a proper position for setting a desirable grey level. During the retaining period, the charged particles of the pixels are retained to stay in the positions respectively adjusted during the writing period so as to display an image. However, each gate signal holds a low reference voltage for most of operating time, i.e. each gate signal holds a high reference voltage only for small part of operating time. For that reason, the voltage stress of the data switch is mainly caused by the low reference voltage, which is likely to incur an occurrence of threshold voltage drift and degrades the reliability and life-time of the electrophoretic display.

SUMMARY OF THE INVENTION

In accordance with one embodiment of the present invention, an electrophoretic display with threshold voltage drift compensation functionality is provided. The electrophoretic display comprises a gate driving circuit, a data driving circuit, a controller and a pixel array unit. The gate driving circuit is utilized for providing a plurality of gate signals according to a scan control signal and a high reference voltage. Each of the gate signals includes a writing enable pulse and a compensation pulse. The data driving circuit is utilized for providing a plurality of data signals according to a data control signal. The data signals are set to hold a common voltage during a compensation period. The controller, electrically connected to the gate driving circuit and the data driving circuit, is employed to provide the scan control signal and the data control signal. The pixel array unit, electrically connected to the gate driving circuit and the data driving circuit, is utilized for displaying images according to the gate signals and the data signals. In the operation of the electrophoretic display, the gate driving circuit provides the writing enable pulse with the high reference voltage during a writing period, and the gate driving circuit provides the compensation pulse with the high reference voltage during the compensation period.

In accordance with another embodiment of the present invention, an electrophoretic display with threshold voltage drift compensation functionality is provided. The electrophoretic display comprises a driving voltage generator, a gate driving circuit, a data driving circuit, a controller, a pixel array unit, a compensation unit and a plurality of gate lines. The driving voltage generator is employed to provide a first high reference voltage and a low reference voltage. The gate driving circuit, electrically connected to the driving voltage generator, is utilized for providing a plurality of gate signals according to a scan control signal, the first high reference voltage and the low reference voltage. The data driving circuit is utilized for providing a plurality of data signals according to a data control signal. The data signals are set to hold a common voltage during a compensation period. The controller, electrically connected to the gate driving circuit and the data driving circuit, is employed to provide the scan control signal and the data control signal. The pixel array unit, electrically connected to the gate driving circuit and the data driving circuit, is utilized for displaying images according to the gate signals and the data signals. The compensation unit, electrically connected to the pixel array unit, is employed to provide a plurality of compensation pulses having a second high reference voltage. The gate lines, electrically connected to the gate driving circuit, the compensation unit and the pixel array unit, is employed to deliver either the gate signals or the compensation pulses. In the operation of the electrophoretic display, the gate lines are employed to deliver the gate signals provided by the gate driving circuit during a writing period, and the gate lines are employed to deliver the compensation pulses provided by the compensation unit during the compensation period.

Moreover, the present invention provides a method of driving an electrophoretic display. The method comprises: providing a data signal to a pixel of the electrophoretic display during a writing period of a frame time; providing a gate signal having a writing enable pulse with a first high reference voltage for turning on a data switch of the pixel so as to write the data signal into the pixel during the writing period; providing the data signal having a common voltage to the pixel during a compensation period of the frame time; and providing a compensation pulse having a second high reference voltage to the data switch for performing a threshold voltage drift compensation operation on the data switch during the compensation period.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers regarding the method of driving an electrophoretic display are not meant thereto limit the operating sequence, and any rearrangement of the operating sequence for achieving same functionality is still within the spirit and scope of the invention.

Figure 1:
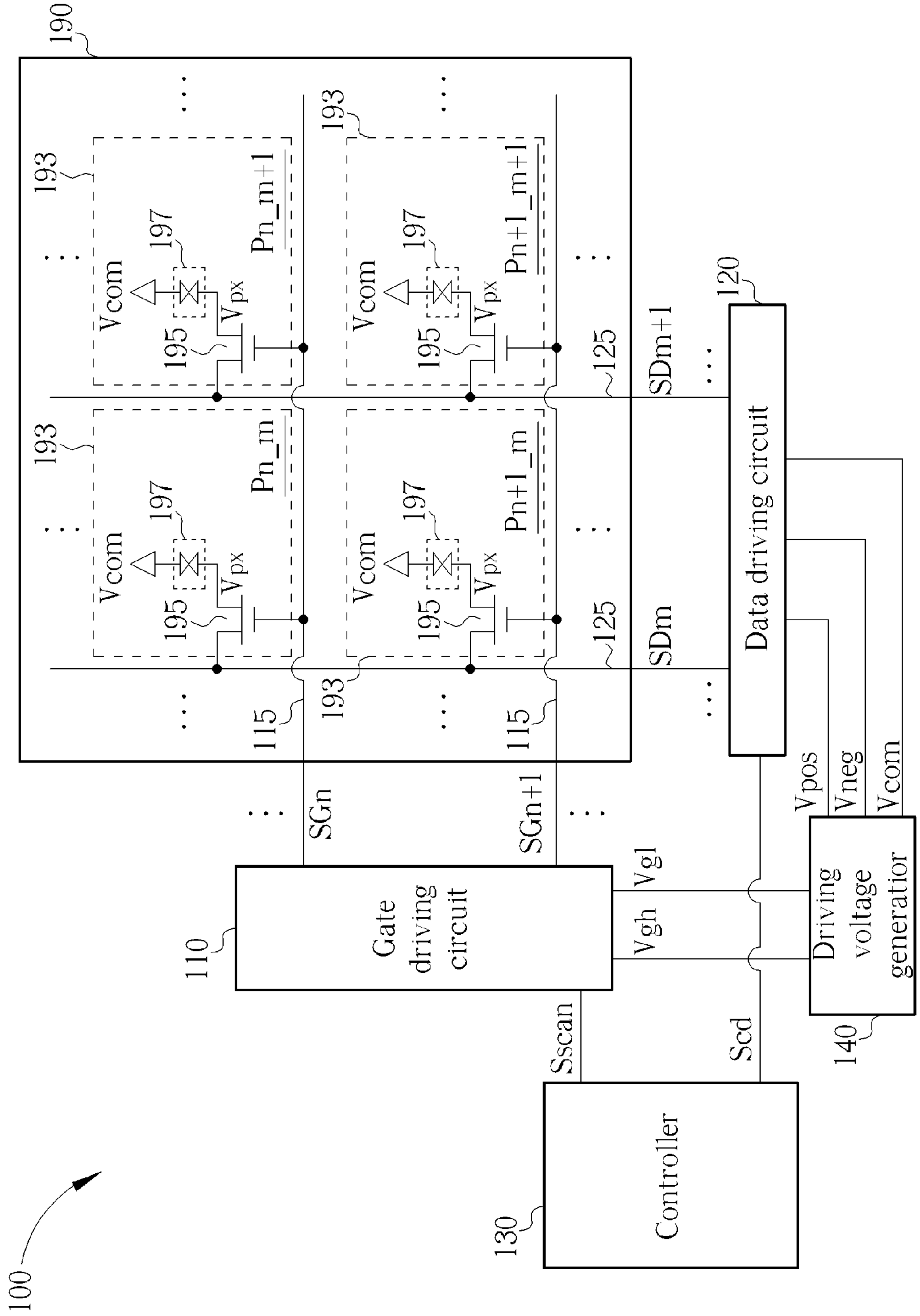
FIG. 1 is a schematic diagram showing an electrophoretic display in accordance with a first embodiment of the present invention.

FIG. 1 is a schematic diagram showing an electrophoretic display in accordance with a first embodiment of the present invention. As shown in FIG. 1, the electrophoretic display 100 comprises a gate driving circuit 110, a data driving circuit 120, a plurality of gate lines 115, a plurality of data lines 125, a controller 130, a driving voltage generator 140 and a pixel array unit 190. The pixel array unit 190 includes plural pixels 193 such as the pixel Pn_m, the pixel Pn_m+1, the pixel Pn+1_m and the pixel Pn+1_m+1. Each pixel 193 has a data switch 195 and an electrophoretic capacitor 197. The driving voltage generator 140 is employed to provide a high reference voltage Vgh, a low reference voltage Vgl, a common voltage Vcom, a positive driving voltage Vpos and a negative driving voltage Vneg. The common voltage Vcom is furnished to each of the electrophoretic capacitors 197. The controller 130 is employed to provide a scan control signal Scan and a data control signal Scd.

The gate driving circuit 110, electrically connected to the controller 130, the driving voltage generator 140 and the pixel array unit 190, is utilized for providing a plurality of gate signals, e.g. the gate signal SGn and the gate signal SGn+1, according to the scan control signal Scan, the high reference voltage Vgh and the low reference voltage Vgl. The data driving circuit 120, electrically connected to the controller 130, the driving voltage generator 140 and the pixel array unit 190, is utilized for providing a plurality of data signals, e.g. the data signal SDm and the data signal SDm+1, according to the data control signal Scd, the positive driving voltage Vpos, the negative driving voltage Vneg and the common voltage Vcom. The gate lines 115, electrically connected to the gate driving circuit 110, are put in use for delivering the gate signals to the pixels 193. The data lines 125, electrically connected to the data driving circuit 120, are put in use for delivering the data signals to the pixels 193. Each pixel 193, electrically connected to one corresponding gate line 115 and one corresponding data line 125, is utilized for writing one corresponding data signal to become a pixel voltage Vpx according to one corresponding gate signal. And the voltage difference between the pixel voltage Vpx and the common voltage Vcom, at opposite ends of the electrophoretic capacitor 197 therein, is then employed to adjust the suspension position of the charged particles in the electrophoretic medium of the electrophoretic capacitor 197.

Figure 2:
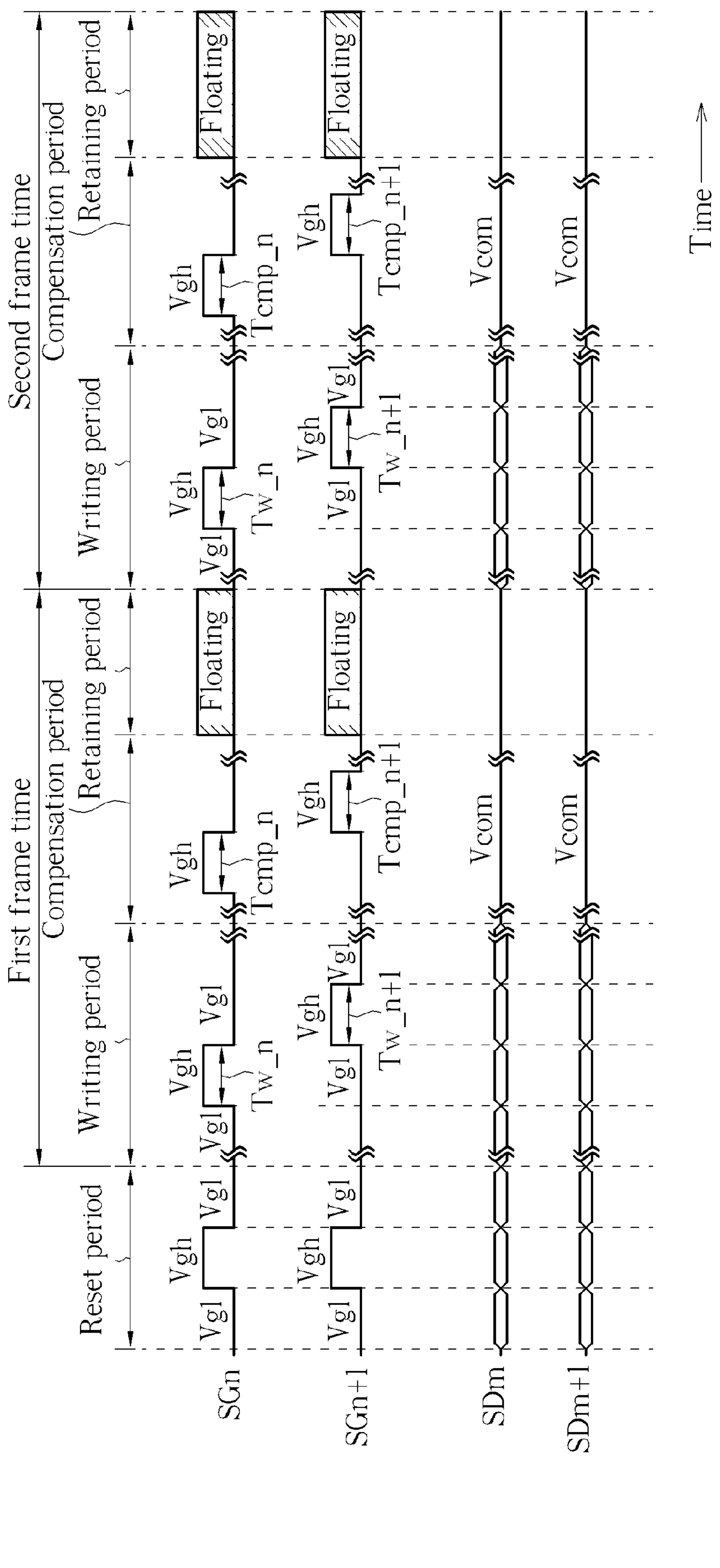
FIG. 2 is a schematic diagram showing related signal waveforms regarding the operation of the electrophoretic display in FIG. 1, having time along the abscissa.

FIG. 2 is a schematic diagram showing related signal waveforms regarding the operation of the electrophoretic display 100 in FIG. 1, having time along the abscissa. The signal waveforms in FIG. 2, from top to bottom, are the gate signal SGn, the gate signal SGn+1, the data signal SDm and the data signal SDm+1. When the electrophoretic display 100 is initially powered, each of the gate signals SGn, SGn+1 includes a reset pulse with the high reference voltage Vgh for turning on the data switches 195 so as to furnish the data signals SDm, SDm+1 into the electrophoretic capacitors 197 during a reset period. And the inactive charged particles in the electrophoretic medium are then stimulated and moved to an initial position.

During a writing period within each frame time, the gate driving circuit 110 sequentially outputs the gate signals SGn, SGn+1 having writing enable pulses with the high reference voltage Vgh for providing a control of writing the data signals SDm, SDm+1. For instance, during a writing sub-period Tw_n, the gate signal SGn having a writing enable pulse with the high reference voltage Vgh is utilized for enabling the pixel Pn_m to write the data signal SDm into the electrophoretic capacitor 197 thereof and also for enabling the pixel Pn_m+1 to write the data signal SDm+1 into the electrophoretic capacitor 197 thereof. Thereafter, during a writing sub-period Tw_n+1, the gate signal SGn+1 having a writing enable pulse with the high reference voltage Vgh is utilized for enabling the pixel Pn+1_m to write the data signal SDm into the electrophoretic capacitor 197 thereof and also for enabling the pixel Pn+1_m+1 to write the data signal SDm+1 into the electrophoretic capacitor 197 thereof. It is noted that the high reference voltage Vgh of the writing enable pulse can be identical to or different from the high reference voltage Vgh of the reset pulse. Also, the low reference voltage Vgl of the gate signals SGn, SGn+1 during the writing period can be identical to or different from the low reference voltage Vgl of the gate signals SGn, SGn+1 during the reset period.

During a compensation period within each frame time, the gate driving circuit 110 sequentially outputs the gate signals SGn, SGn+1 having compensation pulses with the high reference voltage Vgh for performing threshold voltage drift compensation operations on the data switches 195 of the pixels 193. For instance, during a compensation sub-period Tcmp_n, the gate signal SGn having a compensation pulse with the high reference voltage Vgh is employed to perform a threshold voltage drift compensation operation on the data switches 195 of the pixels Pn_m and Pn_m+1. Thereafter, during a compensation sub-period Tcmp_n+1, the gate signal SGn+1 having a compensation pulse with the high reference voltage Vgh is employed to perform a threshold voltage drift compensation operation on the data switches 195 of the pixels Pn+1_m and Pn+1_m+1. It is noted that the data driving circuit 120 sets all the data signals to be the common voltage Vcom during the compensation period.

As shown in FIG. 2, each of the gate signals SGn, SGn+1 holds the low reference voltage Vgl during plural first intervals within one writing period and during plural second intervals within the reset period. In one embodiment, the controller 130 is further employed to adjust the length of each compensation pulse according to a first accumulation time of the first intervals within one writing period and/or a second accumulation time of the second intervals within the reset period. More specifically, the controller 130 can be employed to adjust the length of each compensation pulse according to a first ratio of the first accumulation time to the writing period and/or a second ratio of the second accumulation time to the reset period. In another embodiment, the driving voltage generator 140 is further employed to adjust the high reference voltage Vgh of each compensation pulse according to the first accumulation time and/or the second accumulation time. More specifically, the driving voltage generator 140 can be employed to adjust the high reference voltage Vgh of each compensation pulse according to the first ratio and/or the second ratio. That is, the compensation pulse and the writing enable pulse may have different high reference voltages Vgh.

During a retaining period within each frame time, all the gate signals are in a floating state, and therefore all the data switches 195 are in a turn-off state so that all the pixel voltages Vpx are able to retain the common voltage Vcom. In the meantime, since the data signals cannot be furnished into the electrophoretic capacitors 197, the data signals are then not required to hold the common voltage Vcom. To sum up, in the operation of the electrophoretic display 100, each frame time includes a compensation period for performing threshold voltage drift compensation operations on the data switches 195 of the pixel array unit 190, for significantly enhancing the reliability and life-time of the electrophoretic display 100.

Figure 3:
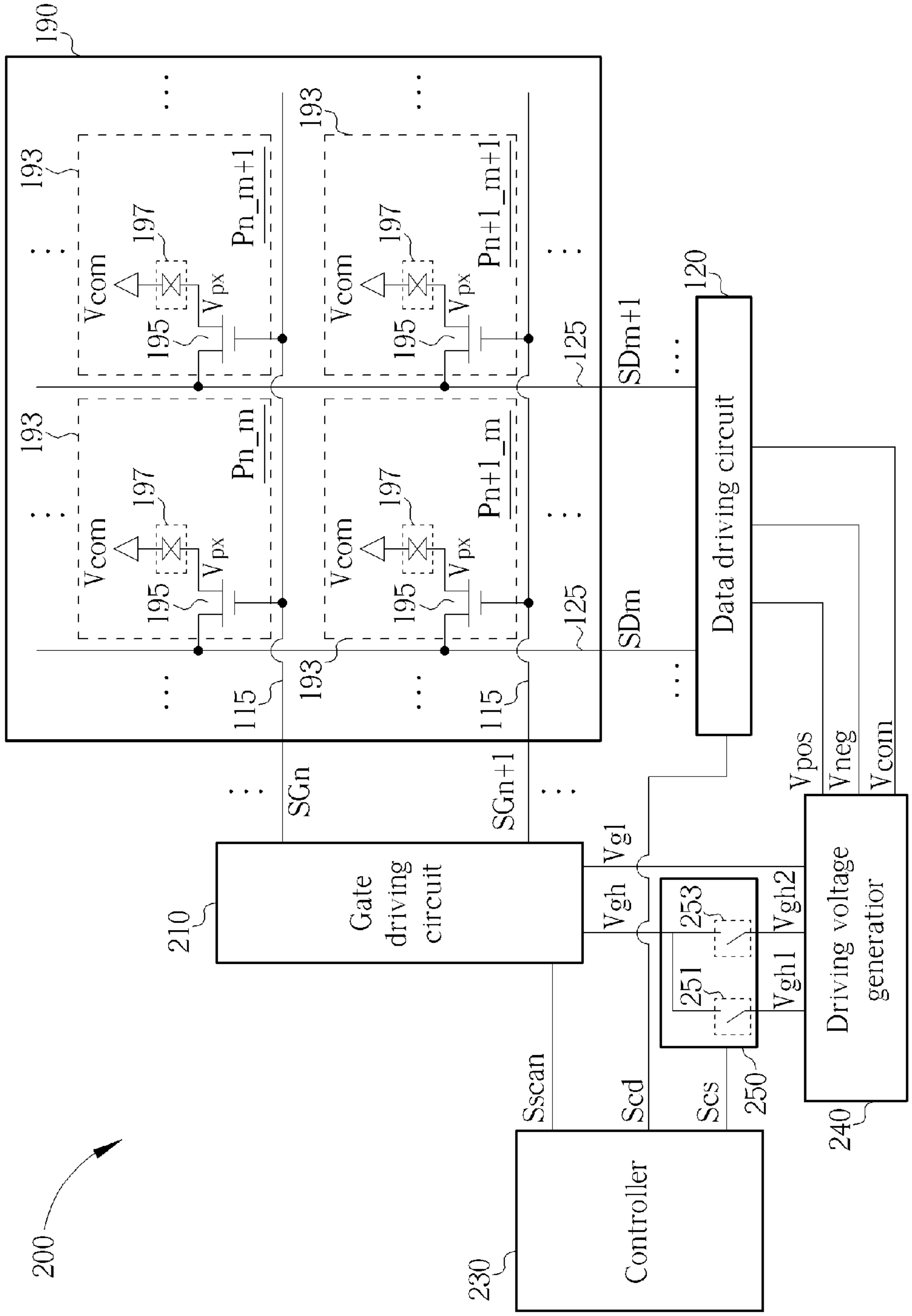
FIG. 3 is a schematic diagram showing an electrophoretic display in accordance with a second embodiment of the present invention.

FIG. 3 is a schematic diagram showing an electrophoretic display in accordance with a second embodiment of the present invention. As shown in FIG. 3, the electrophoretic display 200 comprises a gate driving circuit 210, the data driving circuit 120, the gate lines 115, the data lines 125, a controller 230, a driving voltage generator 240, a voltage selector 250 and the pixel array unit 190. The driving voltage generator 240 is employed to provide a first high reference voltage Vgh1, a second high reference voltage Vgh2, a low reference voltage Vgl, a common voltage Vcom, a positive driving voltage Vpos and a negative driving voltage Vneg. The common voltage Vcom is furnished to each of the electrophoretic capacitors 197. The second high reference voltage Vgh2 can be equal to or different from the first high reference voltage Vgh1. The controller 230 is employed to provide a scan control signal Scan, a data control signal Scd and a selection control signal Scs. The voltage selector 250, electrically connected to the driving voltage generator 240, the controller 230 and the gate driving circuit 210, is utilized for selecting either the first high reference voltage Vgh1 or the second high reference voltage Vgh2 to become the high reference voltage Vgh according to the selection control signal Scs. The gate driving circuit 210, electrically connected to the controller 230, the voltage selector 250 and the driving voltage generator 240, is utilized for providing a plurality of gate signals, e.g. the gate signal SGn and the gate signal SGn+1, according to the scan control signal Scan, the high reference voltage Vgh and the low reference voltage Vgl.

In the embodiment shown in FIG. 3, the voltage selector 250 comprises a first switch 251 and a second switch 253. The first switch 251, electrically connected to the controller 230, the driving voltage generator 240 and the gate driving circuit 210, is utilized for outputting the first high reference voltage Vgh1 to become the high reference voltage Vgh according to the selection control signal Scs. The second switch 253, electrically connected to the controller 230, the driving voltage generator 240 and the gate driving circuit 210, is utilized for outputting the second high reference voltage Vgh2 to become the high reference voltage Vgh according to the selection control signal Scs. In the operation of the electrophoretic display 200, during the writing period of each frame time, the controller 230 provides the selection control signal Scs having a first state for turning off the second switch 253 and turning on the first switch 251 so as to output the first high reference voltage Vgh1 to become the high reference voltage Vgh. Besides, during the compensation period of each frame time, the controller 230 provides the selection control signal Scs having a second state for turning off the first switch 251 and turning on the second switch 253 so as to output the second high reference voltage Vgh2 to become the high reference voltage Vgh.

Figure 4:
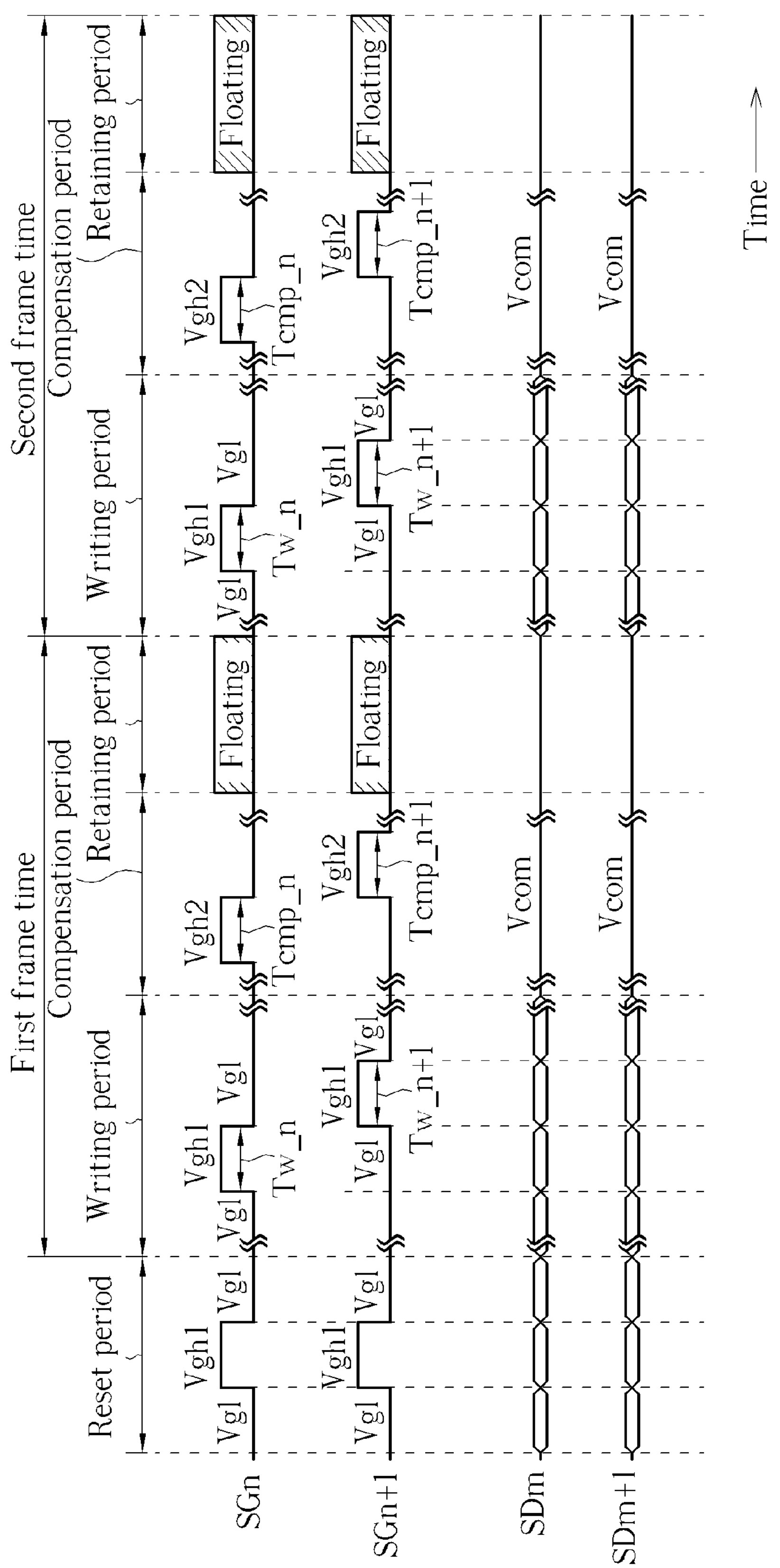
FIG. 4 is a schematic diagram showing related signal waveforms regarding the operation of the electrophoretic display in FIG. 3, having time along the abscissa.

FIG. 4 is a schematic diagram showing related signal waveforms regarding the operation of the electrophoretic display 200 in FIG. 3, having time along the abscissa. The signal waveforms in FIG. 4, from top to bottom, are the gate signal SGn, the gate signal SGn+1, the data signal SDm and the data signal SDm+1. When the electrophoretic display 200 is initially powered, the voltage selector 250 selects the first high reference voltage Vgh1 to become the high reference voltage Vgh, and each of the gate signals SGn, SGn+1 provided by the gate driving circuit 210 includes a reset pulse with the first high reference voltage Vgh1 for turning on the data switches 195 so as to furnish the data signals SDm, SDm+1 into the electrophoretic capacitors 197 during a reset period. And the inactive charged particles in the electrophoretic medium are then stimulated and moved to an initial position.

During a writing period within each frame time, the voltage selector 250 also selects the first high reference voltage Vgh1 to become the high reference voltage Vgh, and the gate driving circuit 210 sequentially outputs the gate signals SGn, SGn+1 having writing enable pulses with the first high reference voltage Vgh1 for providing a control of writing the data signals SDm, SDm+1. For instance, during a writing sub-period Tw_n, the gate signal SGn having a writing enable pulse with the first high reference voltage Vgh1 is utilized for enabling the pixel Pn_m to write the data signal SDm into the electrophoretic capacitor 197 thereof and also for enabling the pixel Pn_m+1 to write the data signal SDm+1 into the electrophoretic capacitor 197 thereof. Thereafter, during a writing sub-period Tw_n+1, the gate signal SGn+1 having a writing enable pulse with the first high reference voltage Vgh1 is utilized for enabling the pixel Pn+1_m to write the data signal SDm into the electrophoretic capacitor 197 thereof and also for enabling the pixel Pn+1_m+1 to write the data signal SDm+1 into the electrophoretic capacitor 197 thereof. It is noted that the low reference voltage Vgl of the gate signals SGn, SGn+1 during the writing period can be identical to or different from the low reference voltage Vgl of the gate signals SGn, SGn+1 during the reset period.

During a compensation period within each frame time, the voltage selector 250 selects the second high reference voltage Vgh2 to become the high reference voltage Vgh, and the gate driving circuit 210 sequentially outputs the gate signals SGn, SGn+1 having compensation pulses with the second high reference voltage Vgh2 for performing threshold voltage drift compensation operations on the data switches 195 of the pixels 193. For instance, during a compensation sub-period Tcmp_n, the gate signal SGn having a compensation pulse with the second high reference voltage Vgh2 is employed to perform a threshold voltage drift compensation operation on the data switches 195 of the pixels Pn_m and Pn_m+1. Thereafter, during a compensation sub-period Tcmp_n+1, the gate signal SGn+1 having a compensation pulse with the second high reference voltage Vgh2 is employed to perform a threshold voltage drift compensation operation on the data switches 195 of the pixels Pn+1_m and Pn+1_m+1. It is noted that, as aforementioned, the data driving circuit 120 sets all the data signals to be the common voltage Vcom during the compensation period.

As shown in FIG. 4, each of the gate signals SGn, SGn+1 holds the low reference voltage Vgl during plural first intervals within one writing period and during plural second intervals within the reset period. In one embodiment, the controller 230 is further employed to adjust the length of each compensation pulse according to a first accumulation time of the first intervals within one writing period and/or a second accumulation time of the second intervals within the reset period. More specifically, the controller 230 can be employed to adjust the length of each compensation pulse according to a first ratio of the first accumulation time to the writing period and/or a second ratio of the second accumulation time to the reset period. In another embodiment, the driving voltage generator 240 is further employed to adjust the second high reference voltage Vgh2 according to the first accumulation time and/or the second accumulation time. More specifically, the driving voltage generator 240 can be employed to adjust the second high reference voltage Vgh2 according to the first ratio and/or the second ratio. During a retaining period, the operation of the electrophoretic display 200 is identical to the aforementioned operation of the electrophoretic display 100. To sum up, in the operation of the electrophoretic display 200, each frame time includes a compensation period for performing threshold voltage drift compensation operations on the data switches 195 of the pixel array unit 190, for significantly enhancing the reliability and life-time of the electrophoretic display 200.

Figure 5:
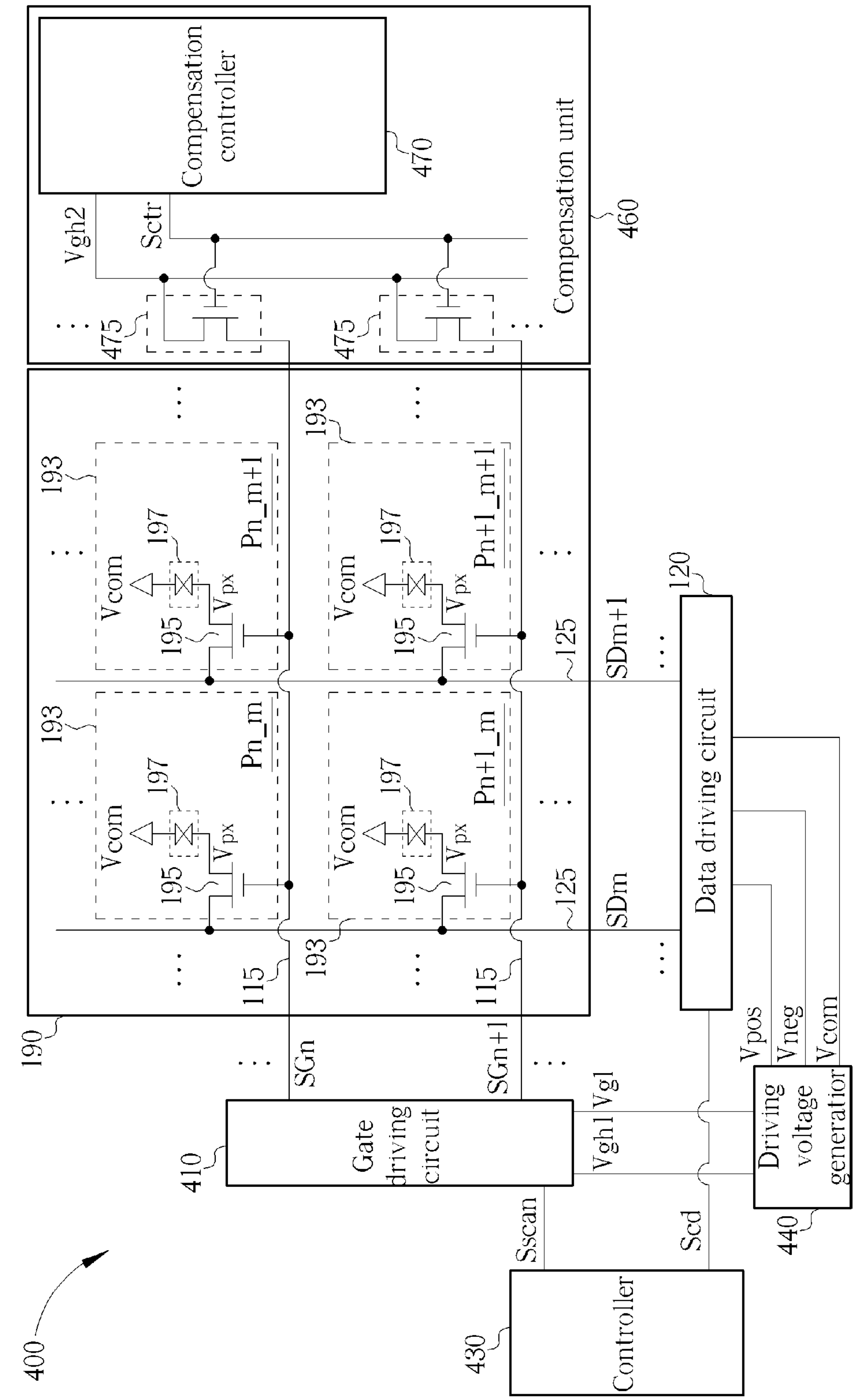
FIG. 5 is a schematic diagram showing an electrophoretic display in accordance with a third embodiment of the present invention.

FIG. 5 is a schematic diagram showing an electrophoretic display in accordance with a third embodiment of the present invention. As shown in FIG. 5, the electrophoretic display 400 comprises a gate driving circuit 410, the data driving circuit 120, the gate lines 115, the data lines 125, a controller 430, a driving voltage generator 440, a compensation unit 460 and the pixel array unit 190. The driving voltage generator 440 is employed to provide a first high reference voltage Vgh1, a low reference voltage Vgl, a common voltage Vcom, a positive driving voltage Vpos and a negative driving voltage Vneg. The common voltage Vcom is furnished to each of the electrophoretic capacitors 197. The controller 430 is employed to provide a scan control signal Scan and a data control signal Scd. The gate driving circuit 410, electrically connected to the controller 430 and the driving voltage generator 440, is utilized for providing a plurality of gate signals, e.g. the gate signal SGn and the gate signal SGn+1, according to the scan control signal Scan, the first high reference voltage Vgh1 and the low reference voltage Vgl.

The compensation unit 460, electrically connected to the pixel array unit 190 via the gate lines 115, is employed to provide a plurality of compensation pulses functioning as the gate signals during a compensation period. And the compensation pulses with a second high reference voltage Vgh2 are utilized for performing threshold voltage drift compensation operations on the data switches 195 of the pixels 193. In other words, the gate lines 115 are employed to deliver the gate signals generated by the gate driving circuit 410 during a writing period, and the gate lines 115 are employed to deliver the compensation pulses generated by the compensation unit 460 during a compensation period. In the embodiment shown in FIG. 5, the compensation unit 460 includes a compensation controller 470 and a plurality of switches 475. The compensation controller 470 is employed to provide the second high reference voltage Vgh2 and a switch control signal Sctr. The second high reference voltage Vgh2 can be equal to or different from the first high reference voltage Vgh1. Each switch 475 comprises a first end electrically connected to the compensation controller 470 for receiving the second high reference voltage Vgh2, a second end for outputting a compensation pulse to one corresponding gate line 115, and a control end electrically connected to the compensation controller 470 for receiving the switch control signal Sctr.

Figure 6:
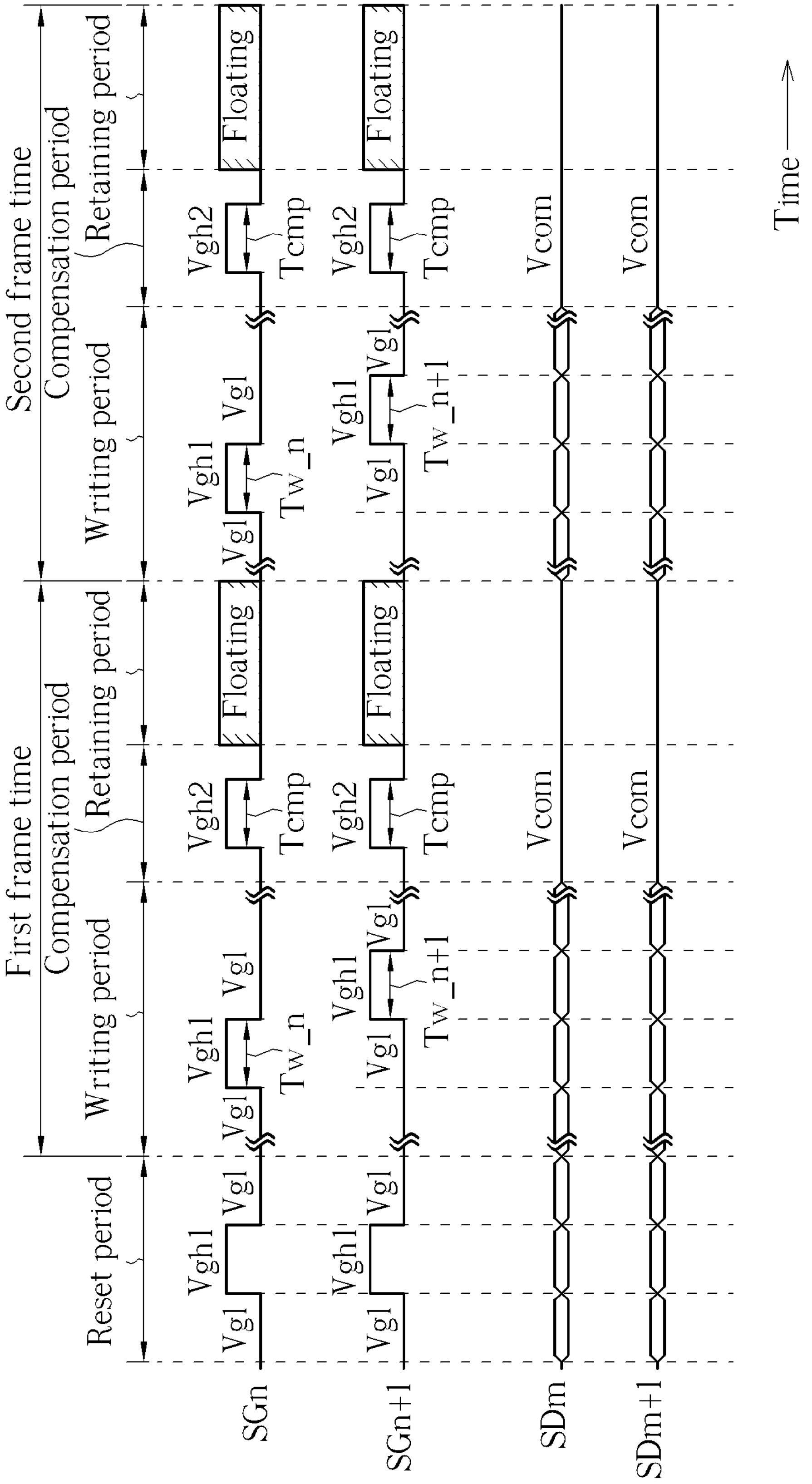
FIG. 6 is a schematic diagram showing related signal waveforms regarding the operation of the electrophoretic display in FIG. 5, having time along the abscissa.

FIG. 6 is a schematic diagram showing related signal waveforms regarding the operation of the electrophoretic display 400 in FIG. 5, having time along the abscissa. The signal waveforms in FIG. 6, from top to bottom, are the gate signal SGn, the gate signal SGn+1, the data signal SDm and the data signal SDm+1. When the electrophoretic display 400 is initially powered, each of the gate signals SGn, SGn+1 includes a reset pulse with the first high reference voltage Vgh1 for turning on the data switches 195 so as to furnish the data signals SDm, SDm+1 into the electrophoretic capacitors 197 during a reset period. And the inactive charged particles in the electrophoretic medium are then stimulated and moved to an initial position.

During a writing period within each frame time, the gate driving circuit 410 sequentially outputs the gate signals SGn, SGn+1 having writing enable pulses with the first high reference voltage Vgh1 for providing a control of writing the data signals SDm, SDm+1. For instance, during a writing sub-period Tw_n, the gate signal SGn having a writing enable pulse with the first high reference voltage Vgh1 is utilized for enabling the pixel Pn_m to write the data signal SDm into the electrophoretic capacitor 197 thereof and also for enabling the pixel Pn_m+1 to write the data signal SDm+1 into the electrophoretic capacitor 197 thereof. Thereafter, during a writing sub-period Tw_n+1, the gate signal SGn+1 having a writing enable pulse with the first high reference voltage Vgh1 is utilized for enabling the pixel Pn+1_m to write the data signal SDm into the electrophoretic capacitor 197 thereof and also for enabling the pixel Pn+1_m+1 to write the data signal SDm+1 into the electrophoretic capacitor 197 thereof. It is noted that the low reference voltage Vgl of the gate signals SGn, SGn+1 during the writing period can be identical to or different from the low reference voltage Vgl of the gate signals SGn, SGn+1 during the reset period.

During a compensation period within each frame time, the compensation unit 460 simultaneously outputs the compensation pulses functioning as the gate signals to be delivered by the gate lines 115. The compensation pulses with the second high reference voltage Vgh2 are employed to perform threshold voltage drift compensation operations on the data switches 195 of the pixels 193. For instance, during a compensation sub-period Tcmp, each of the gate signals SGn, SGn+1 includes a compensation pulse with the second high reference voltage Vgh2, and the compensation pulses are then employed to perform threshold voltage drift compensation operations on the data switches 195 of the pixels Pn_m, Pn_m+1, Pn+1_m and Pn+1_m+1 at the same time. It is noted that, as aforementioned, the data driving circuit 120 sets all the data signals to be the common voltage Vcom during the compensation period.

As shown in FIG. 6, each of the gate signals SGn, SGn+1 holds the low reference voltage Vgl during plural first intervals within one writing period and during plural second intervals within the reset period. In one embodiment, the compensation unit 460 is further employed to adjust the length of each compensation pulse according to a first accumulation time of the first intervals within one writing period and/or a second accumulation time of the second intervals within the reset period. More specifically, the compensation unit 460 can be employed to adjust the length of each compensation pulse according to a first ratio of the first accumulation time to the writing period and/or a second ratio of the second accumulation time to the reset period. In another embodiment, the compensation unit 460 is further employed to adjust the second high reference voltage Vgh2 according to the first accumulation time and/or the second accumulation time. More specifically, the compensation unit 460 can be employed to adjust the second high reference voltage Vgh2 according to the first ratio and/or the second ratio. During a retaining period, the operation of the electrophoretic display 400 is identical to the aforementioned operation of the electrophoretic display 100. To sum up, in the operation of the electrophoretic display 400, each frame time includes a compensation period for performing threshold voltage drift compensation operations on the data switches 195 of the pixel array unit 190, for significantly enhancing the reliability and life-time of the electrophoretic display 400.

Figure 7:
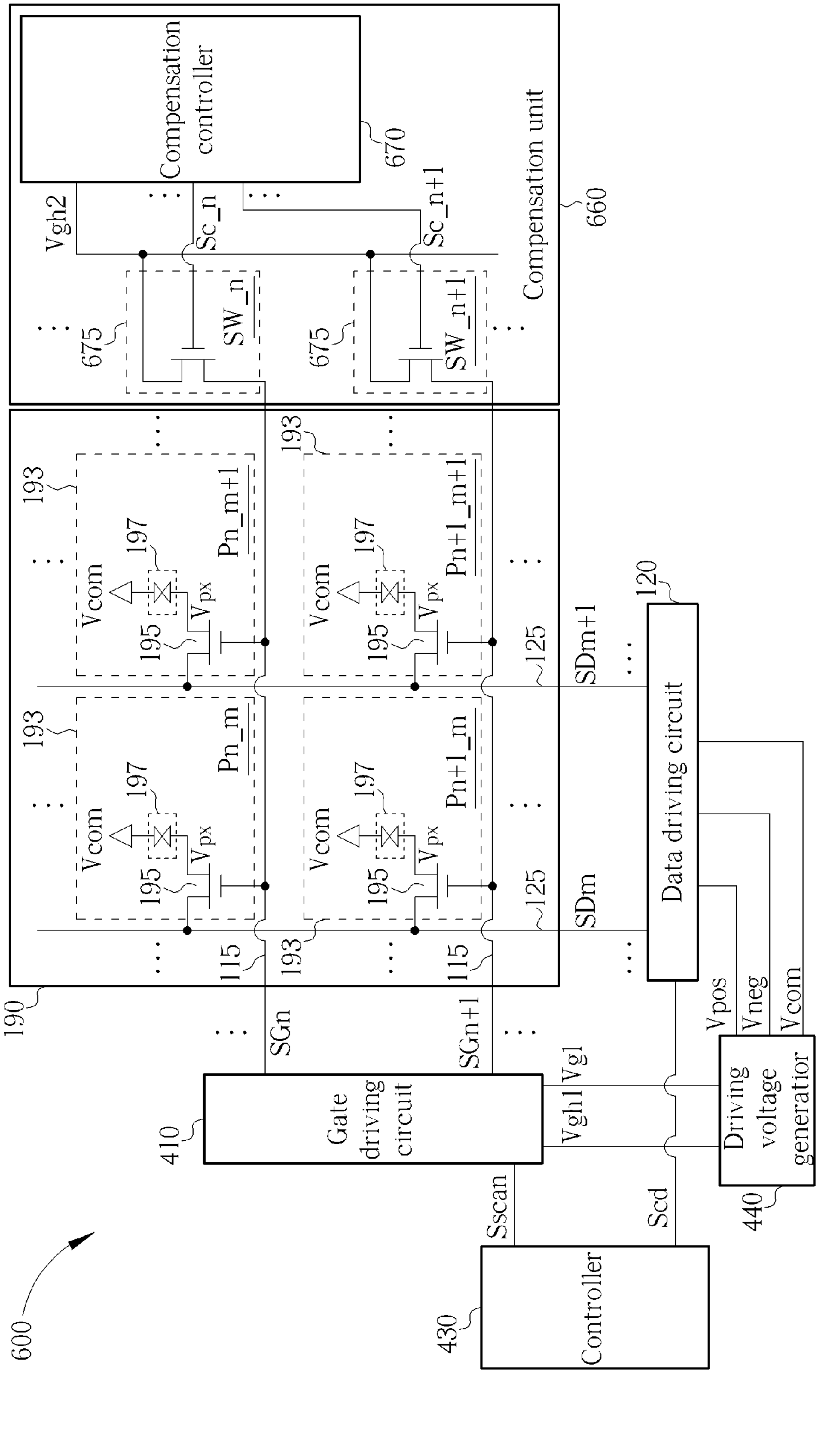
FIG. 7 is a schematic diagram showing an electrophoretic display in accordance with a fourth embodiment of the present invention.

FIG. 7 is a schematic diagram showing an electrophoretic display in accordance with a fourth embodiment of the present invention. As shown in FIG. 7, the electrophoretic display 600 is similar to the electrophoretic display 400 shown in FIG. 5, differing only in that the compensation unit 460 is replaced with a compensation unit 660. The compensation unit 660 includes a compensation controller 670 and a plurality of switches 675. The compensation controller 670 is employed to provide a second high reference voltage Vgh2 and a plurality of switch control signals, e.g. the switch control signal Sc_n and the switch control signal Sc_n+1. The second high reference voltage Vgh2 can be equal to or different from the first high reference voltage Vgh1. Each switch 675 comprises a first end electrically connected to the compensation controller 670 for receiving the second high reference voltage Vgh2, a second end for outputting a compensation pulse to one corresponding gate line 115, and a control end electrically connected to the compensation controller 670 for receiving one corresponding switch control signal. For instance, the control end of the switch SW_n is electrically connected to the compensation controller 670 for receiving the switch control signal Sc_n, and the control end of the switch SW_n+1 is electrically connected to the compensation controller 670 for receiving the switch control signal Sc_n+1.

The related signal waveforms regarding the operation of the electrophoretic display 600 are similar to the waveforms shown in FIG. 4. Referring to FIG. 4, when the electrophoretic display 600 is working in a compensation period, the switch control signals provided by the compensation controller 670 are employed to sequentially turn on the switches 675 for providing the compensation pulses functioning as the gate signals. The compensation pulses with the second high reference voltage Vgh2 are employed to perform threshold voltage drift compensation operations on the data switches 195 of the pixels 193. For instance, during a compensation sub-period Tcmp_n, the compensation controller 670 provides the switch control signal Sc_n for turning on the switch SW_n so as to provide a compensation pulse with the second high reference voltage Vgh2 for performing a threshold voltage drift compensation operation on the data switches 195 of the pixels Pn_m and Pn_m+1. Thereafter, during a compensation sub-period Tcmp_n+1, the compensation controller 670 provides the switch control signal Sc_n+1 for turning on the switch SW_n+1 so as to provide a compensation pulse with the second high reference voltage Vgh2 for performing a threshold voltage drift compensation operation on the data switches 195 of the pixels Pn+1_m and Pn+1_m+1.

It is noted that, as aforementioned, the data driving circuit 120 sets all the data signals to be the common voltage Vcom during the compensation period. Compared with the electrophoretic display 400 shown in FIG. 5, the compensation unit 660 of the electrophoretic display 600 is not required to simultaneously provide plural compensation pulses for performing threshold voltage drift compensation operations on all the data switches 195 at the same time. Therefore, compared with the compensation controller 470 in FIG. 5, the compensation controller 670 is not required to provide high driving ability for outputting the second high reference voltage Vgh2 so as to bring the cost down. The other operations of the electrophoretic display 600 are identical to the electrophoretic display 400 in FIG. 5 and, for the sake of brevity, further similar discussion thereof is omitted.

Figure 8:
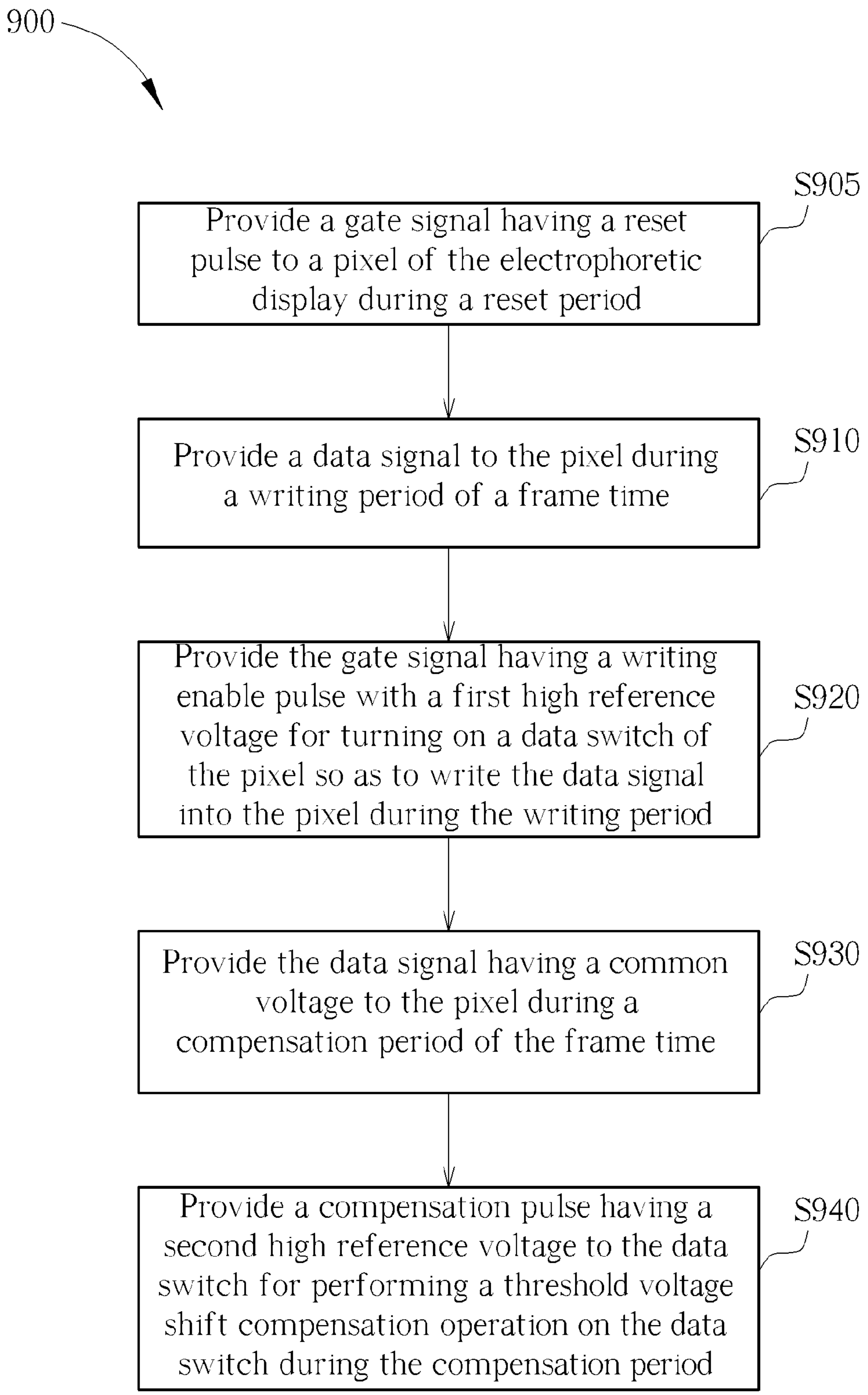
FIG. 8 is a flowchart depicting a method of driving an electrophoretic display according to the present invention.

FIG. 8 is a flowchart depicting a method of driving an electrophoretic display according to the present invention. The method regarding the flow 900 shown in FIG. 8 is implemented based on the pixel array unit 190 aforementioned in the first through fourth embodiments. The method illustrated in the flow 900 comprises the following steps:

Step S905: providing a gate signal having a reset pulse to a pixel of the electrophoretic display during a reset period;

Step S910: providing a data signal to the pixel during a writing period of a frame time;

Step S920: providing the gate signal having a writing enable pulse with a first high reference voltage for turning on a data switch of the pixel so as to write the data signal into the pixel during the writing period;

Step S930: providing the data signal having a common voltage to the pixel during a compensation period of the frame time; and Step S940: providing a compensation pulse having a second high reference voltage to the data switch for performing a threshold voltage drift compensation operation on the data switch during the compensation period.

In the flow 900 illustrating the method of driving the electrophoretic display, the gate signal is required to hold a low reference voltage during plural first intervals within the writing period and during plural second intervals within the reset period. And therefore the second high reference voltage of the compensation pulse can be adjusted according to a first accumulation time of the first intervals within the writing period and/or a second accumulation time of the second intervals within the reset period. More specifically, the second high reference voltage of the compensation pulse can be adjusted according to a first ratio of the first accumulation time to the writing period and/or a second ratio of the second accumulation time to the reset period. In addition, the length of the compensation pulse can be adjusted according to the first accumulation time and/or the second accumulation time. More specifically, the length of the compensation pulse can be adjusted according to the first ratio and/or the second ratio.

In conclusion, regarding the operation of the electrophoretic display according to the present invention, each frame time further comprises a compensation period for performing threshold voltage drift compensation operations on the data switches of the pixel array unit, for significantly enhancing the reliability and life-time of the electrophoretic display.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. An electrophoretic display, comprising:

a gate driving circuit for providing a plurality of gate signals according to a scan control signal, a high reference voltage and a low reference voltage lower than the high reference voltage, wherein each of the gate signals includes a writing enable pulse and a compensation pulse;

a data driving circuit for providing a plurality of data signals according to a data control signal, wherein the data signals are set to hold a common voltage during a compensation period;

a controller, electrically connected to the gate driving circuit and the data driving circuit, for providing the scan control signal and the data control signal; and a pixel array unit, electrically connected to the gate driving circuit and the data driving circuit, for displaying images according to the gate signals and the data signals;

wherein the gate driving circuit provides the writing enable pulse with the high reference voltage during a writing period, and the gate driving circuit provides the compensation pulse with the high reference voltage during the compensation period; and wherein the gate signal holds the low reference voltage during plural intervals within the writing period, and the high reference voltage and/or a length of the compensation pulse is adjusted according to an accumulation time of the intervals.

2. The electrophoretic display of claim 1, further comprising:

a driving voltage generator, electrically connected to the gate driving circuit, for providing the high reference voltage.

3. The electrophoretic display of claim 1, wherein the driving voltage generator adjusts the high reference voltage of the compensation pulse according to a ratio of the accumulation time to the writing period.

4. The electrophoretic display of claim 1, wherein the controller adjusts the length of the compensation pulse according to a ratio of the accumulation time to the writing period.

5. The electrophoretic display of claim 1, wherein the controller further provides a selection control signal, and wherein the electrophoretic display further comprises:

a driving voltage generator for providing a first high reference voltage and a second high reference voltage, the first high reference voltage and the second high reference voltage being higher than the low reference voltage, the first high reference voltage and the second high reference voltage being different from each other; and a voltage selector, electrically connected to the driving voltage generator, the controller and the gate driving circuit, for selecting either the first high reference voltage or the second high reference voltage to become the high reference voltage according to the selection control signal.

6. The electrophoretic display of claim 5, wherein the voltage selector selects the first high reference voltage to become the high reference voltage during the writing period, and the voltage selector selects the second high reference voltage to become the high reference voltage during the compensation period.

7. The electrophoretic display of claim 6, wherein the gate signal holds a low reference voltage during plural intervals within the writing period, and the driving voltage generator adjusts the second high reference voltage according to an accumulation time of the intervals.

8. The electrophoretic display of claim 7, wherein the driving voltage generator adjusts the second high reference voltage according to a ratio of the accumulation time to the writing period.

9. The electrophoretic display of claim 5, wherein the voltage selector comprises:

a first switch, electrically connected to the controller, the driving voltage generator and the gate driving circuit, for outputting the first high reference voltage to become the high reference voltage according to the selection control signal; and a second switch, electrically connected to the controller, the driving voltage generator and the gate driving circuit, for outputting the second high reference voltage to become the high reference voltage according to the selection control signal;

wherein the first switch is turned on for outputting the first high reference voltage to become the high reference voltage when the selection control signal holds a first state, and the second switch is turned on for outputting the second high reference voltage to become the high reference voltage when the selection control signal holds a second state.

10. An electrophoretic display, comprising:

a driving voltage generator for providing a first high reference voltage and a low reference voltage lower than the first high reference voltage;

a gate driving circuit, electrically connected to the driving voltage generator, for providing a plurality of gate signals according to a scan control signal, the first high reference voltage and the low reference voltage;

a data driving circuit for providing a plurality of data signals according to a data control signal, wherein the data signals are set to hold a common voltage during a compensation period;

a controller, electrically connected to the gate driving circuit and the data driving circuit, for providing the scan control signal and the data control signal;

a pixel array unit, electrically connected to the gate driving circuit and the data driving circuit, for displaying images according to the gate signals and the data signals;

a compensation unit, electrically connected to the pixel array unit, for providing a plurality of compensation pulses having a second high reference voltage higher than the low reference voltage; and a plurality of gate lines, electrically connected to the gate driving circuit, the compensation unit and the pixel array unit, for delivering either the gate signals or the compensation pulses;

wherein the gate lines are employed to deliver the gate signals provided by the gate driving circuit during a writing period, and the gate lines are employed to deliver the compensation pulses provided by the compensation unit during the compensation period; and wherein each of the gate signals holds the low reference voltage during plural intervals within the writing period, and the compensation unit adjusts the second high reference voltage and/or a length of each of the compensation pulses according to an accumulation time of the intervals.

11. The electrophoretic display of claim 10, wherein the compensation unit adjusts the second high reference voltage according to a ratio of the accumulation time to the writing period.

12. The electrophoretic display of claim 10, wherein the compensation unit adjusts the length of each of the compensation pulses according to a ratio of the accumulation time to the writing period.

13. The electrophoretic display of claim 10, wherein the compensation unit comprises:

a compensation controller for providing the second high reference voltage and a switch control signal; and a plurality of switches, each of the switches comprises:

a first end, electrically connected to the compensation controller, for receiving the second high reference voltage;

a second end, electrically connected to a corresponding gate line of the gate lines, for outputting a corresponding compensation pulse of the compensation pulses; and a control end, electrically connected to the compensation controller, for receiving the switch control signal.

14. The electrophoretic display of claim 10, wherein the compensation unit comprises:

a compensation controller for providing the second high reference voltage and a plurality of switch control signals; and a plurality of switches, each of the switches comprises:

a first end, electrically connected to the compensation controller, for receiving the second high reference voltage;

a second end, electrically connected to a corresponding gate line of the gate lines, for outputting a corresponding compensation pulse of the compensation pulses; and a control end, electrically connected to the compensation controller, for receiving a corresponding switch control signal of the switch control signals.

15. A method of driving an electrophoretic display, the method comprising:

providing a data signal to a pixel of the electrophoretic display during a writing period of a frame time;

providing a gate signal having a writing enable pulse with a first high reference voltage for turning on a data switch of the pixel so as to write the data signal into the pixel during the writing period;

providing the data signal having a common voltage to the pixel during a compensation period of the frame time; and providing a compensation pulse having a second high reference voltage to the data switch for performing a threshold voltage drift compensation operation on the data switch during the compensation period;

wherein the gate signal holds a low reference voltage lower than the first high reference voltage and the second high reference voltage during plural intervals within the writing period, and the second high reference voltage and/or a length of the compensation pulse is adjusted according to an accumulation time of the intervals.

16. The method of claim 15, wherein the second high reference voltage of the compensation pulse is adjusted according to a ratio of the accumulation time to the writing period.

17. The method of claim 15, wherein the length of the compensation pulse is adjusted according to a ratio of the accumulation time to the writing period.

18. The method of claim 15, further comprising:

providing the gate signal having a reset pulse to the pixel during a reset period prior to the frame time.

19. The method of claim 18, wherein:

the gate signal holds the low reference voltage during plural first intervals within the writing period and during plural second intervals within the reset period, and the second high reference voltage of the compensation pulse is adjusted according to a first accumulation time of the first intervals and a second accumulation time of the second intervals; and the length of the compensation pulse is adjusted according to the first accumulation time and the second accumulation time.

20. The method of claim 19, wherein:

the second high reference voltage of the compensation pulse is adjusted according to a first ratio of the first accumulation time to the writing period and a second ratio of the second accumulation time to the reset period; and the length of the compensation pulse is adjusted according to the first ratio and the second ratio.

* * * * *